United States Patent [19]

Stothart

[11] Patent Number: 4,622,710
[45] Date of Patent: Nov. 18, 1986

[54] VEHICLE WASHING APPARATUS
[76] Inventor: Geoffrey Stothart, 50 Caburn Heights, Southgate West, Crawley, Sussex RH11 8SS, United Kingdom
[21] Appl. No.: 709,067
[22] Filed: Mar. 5, 1985
[51] Int. Cl.[4] .............................................. B60S 3/06
[52] U.S. Cl. .................................. 15/53 AB; 15/53 A; 15/DIG. 2
[58] Field of Search ........... 15/53 A, 53 AB, DIG. 2, 15/97 B

[56] References Cited

U.S. PATENT DOCUMENTS 4,028,766  6/1977  Bivens .............................. 15/53 AB

FOREIGN PATENT DOCUMENTS 809975  3/1959  United Kingdom ........... 15/DIG. 2

Primary Examiner—Edward L. Roberts
Attorney, Agent, or Firm—Bacon & Thomas

[57] ABSTRACT

Vehicle washing apparatus comprises horizontal rotatable brushes 6,7 moveable along respective pairs of upwardly and downwardly inclined tracks 8,9 which cross over approximately midway along their lengths. In use, the first, initially lower brush 6 is engaged by the front part of a vehicle moving through the apparatus and is moved upwardly along the tracks 8 whereby to wash at least a front portion of the vehicle. Thereafter, the second brush 7 is moved downwardly along the tracks 9 whereby it engages and washes at least a rear portion of the vehicle. In a preferred arrangement, means are provided for returning the brushes 6,7 to their initial positions, and the washing cycle is fully automatic.

9 Claims, 9 Drawing Figures

VEHICLE WASHING APPARATUS

This invention relates to vehicle washing apparatus of the type comprising a number of powered rotating brushes which in use engage and wash the external surfaces of the vehicle.

Various such washing apparatus are known which generally comprise at least one horizontally extending brush which is effective to engage and wash the front, upper and rear surfaces of the vehicle, and laterally spaced vertically extending brushes adapted for engagement with the side surfaces of the vehicle. In addition, such washing apparatus typically includes a plurality of suitably arranged nozzles which are adapted to spray a suitable detergent and water onto the vehicle in use. Vehicle washing apparatus of this kind are known both wherein the vehicle is stationary in use and the brushes are moved by suitable means relative thereto, and wherein the vehicle is moved under its own power or on a suitable conveyor relative to the apparatus.

In either case, it is clearly important with such apparatus that the brushes, particularly those adapted for engagement with the front, upper and rear surfaces of the vehicle, are adapted to or capable of following the contours of the vehicle such that acceptable, all over cleaning is achieved with a range of different types of vehicle. To this end, various mechanisms for providing suitable movement of the brushes relative to the vehicle have been proposed, although these are all somewhat awkward mechanically.

It is therefore an object of this invention to provide a vehicle washing apparatus whereby adequate cleaning of all the surfaces of the vehicle may be achieved which is relatively simple in construction.

Accordingly, the invention provides vehicle washing apparatus of the type wherein a vehicle is moved through the apparatus in use in a longitudinal direction, such apparatus comprising first and second rotatable brushes extending horizontally between and being movable along respective first and second pairs of laterally spaced tracks, which pairs of tracks are respectively upwardly and downwardly inclined in the longitudinal direction and which cross approximately midway along their lengths, the brushes being located initially adjacent the vehicle entry end of the apparatus such that the first brush lies generally below the second, the arrangement being such that in use the first brush is engaged by a front part of a vehicle and is moved upwardly along the first pair of tracks so as to wash at least a front portion of the vehicle, and the second brush is moved downwardly along the second pair of tracks so as to engage and wash at least a rear portion of the vehicle.

Thus, in use, a vehicle moving longitudinally through the apparatus either under its own power or on a suitable conveyor mechanism engages the first, initially lower brush which is thus moved upwardly along its inclined mounting tracks such that the first brush follows the contours of and washes a front portion of the vehicle, and preferably also part of or all of the vehicle roof. In addition, as the vehicle moves through the apparatus, the second roller is moved downwardly along the second pair of tracks so as to engage and wash at least a rear portion of the vehicle. The combined effect of the two rollers is such that efficient cleaning of the front, upper and rear surfaces of the vehicle may be achieved with apparatus which is relatively simple in construction.

The tracks are preferably inclined at an angle of between 15° and 50° to the horizontal.

In a preferred embodiment, actuating means for the second brush are effective to initiate movement thereof into engagement with a vehicle only after the first brush has passed the cross-over point of the tracks. This ensures that the two brushes do not arrive at the cross-over point simultaneously and thus interfere with one another. Such actuating means may conveniently be in the form of suitable switch means mounted on or adjacent one track of the first pair in the region thereof above the cross-over point, which switch means is operable upon the first brush passing thereby to initiate movement of the second brush.

Suitable means are preferably provided for returning the brushes to their initial positions once cleaning of a vehicle is complete. In a preferred embodiment, means are provided for retaining the first brush in its uppermost position (i.e. at a height equal to the height of the uppermost part of the vehicle roof) until after the second brush has been returned to its initial position. This again ensures that the brushes do not foul one another at the cross-over point of the tracks. In a preferred such embodiment, switch means are provided on or adjacent the upper and lowermost ends of one of the second pair of tracks, the lower switch means being operable upon the second brush reaching its lowermost position to initiate the returning of that brush to its initial, uppermost position whereupon the other switch means is operated to cause the first brush to be returned in turn to its initial, lowermost position.

In a preferred embodiment, both the brushes are mounted on suitable trolley assemblies which are movable in the respective tracks. The trolley assemblies are preferably coupled to a suitable counter-balancing arrangement for the brushes by a system of pulleys. The pulley system for the first brush preferably includes a non-return gear or sprocket whereby the brush is retained in its uppermost position until reverse operation of the sprocket is enabled consequent upon the second brush returning to its initial position after the washing cycle is complete.

Apparatus in accordance with the invention may comprise conventional laterally spaced vertical brushes adapted to clean the sides of the vehicle. In addition, any convenient arrangement of spray nozzles for the supply of water and detergent may be provided.

Preferably, suitable control circuitry is provided such that on actuation of a suitable start switch (which may for example form part of a coin operating mechanism or alternatively may be operated automatically upon a vehicle approaching the apparatus), the subsequent washing cycle and returning of the rollers to their initial positions is fully automatic, being controlled by the switch means provided on the first and second pairs of tracks.

A preferred embodiment of the invention will now be described by way of example only with reference to the accompanying drawings, wherein.

Figure 1:
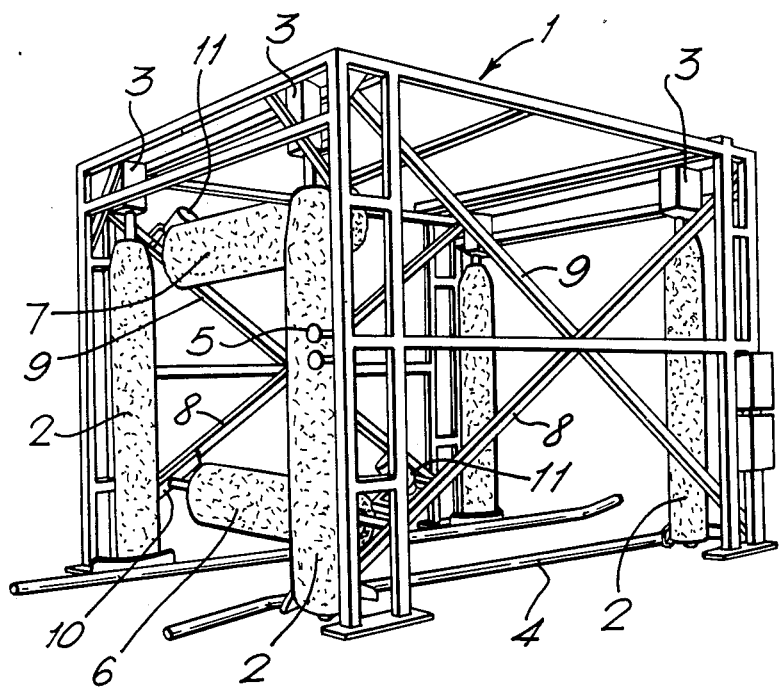
FIG. 1 is a perspective view of vehicle washing apparatus in accordance with the invention.

Referring firstly to FIG. 1, a car washing apparatus comprises a framework 1 defining a tunnel through which in use a vehicle to be cleaned is driven. The framework 1 mounts at each corner a vertical brush 2 rotatable by means of a suitable drive motor 3, the vertical brushes being effective to wash the sides of a vehicle in use. As illustrated, guide rails 4 are provided to ensure that a vehicle is correctly centered as it passes through the apparatus, and suitable traffic lights 5 provide an indication to a driver that the apparatus is ready for use and cleaning may commence. Thus, the illustrated embodiment is adapted to clean vehicles which are driven through the apparatus under their own power, although it will be appreciated that it would also be possible to provide suitable conveying means for the vehicle.

The apparatus also includes first and second horizontal brushes 6, 7 extending between respective pairs of parallel tracks 8, 9. The tracks 8 which mount the first brush 6 are inclined upwardly at an angle of approximately 30° to the horizontal in the direction of movement of a vehicle through the apparatus, while the tracks 9 mounting the second brush 7 are inclined downwardly at a similar angle. The tracks 8, 9 crossover approximately midway along their lengths.

The horizontal rollers 6, 7 are mounted to their respective tracks 8, 9 by means of suitable trolley assemblies 10 (not shown in detail in the drawings) so as to be movable along the tracks, and are rotated in use by suitable drive motors 11 mounted to the trolleys 10 and movable therewith.

Figure 2:
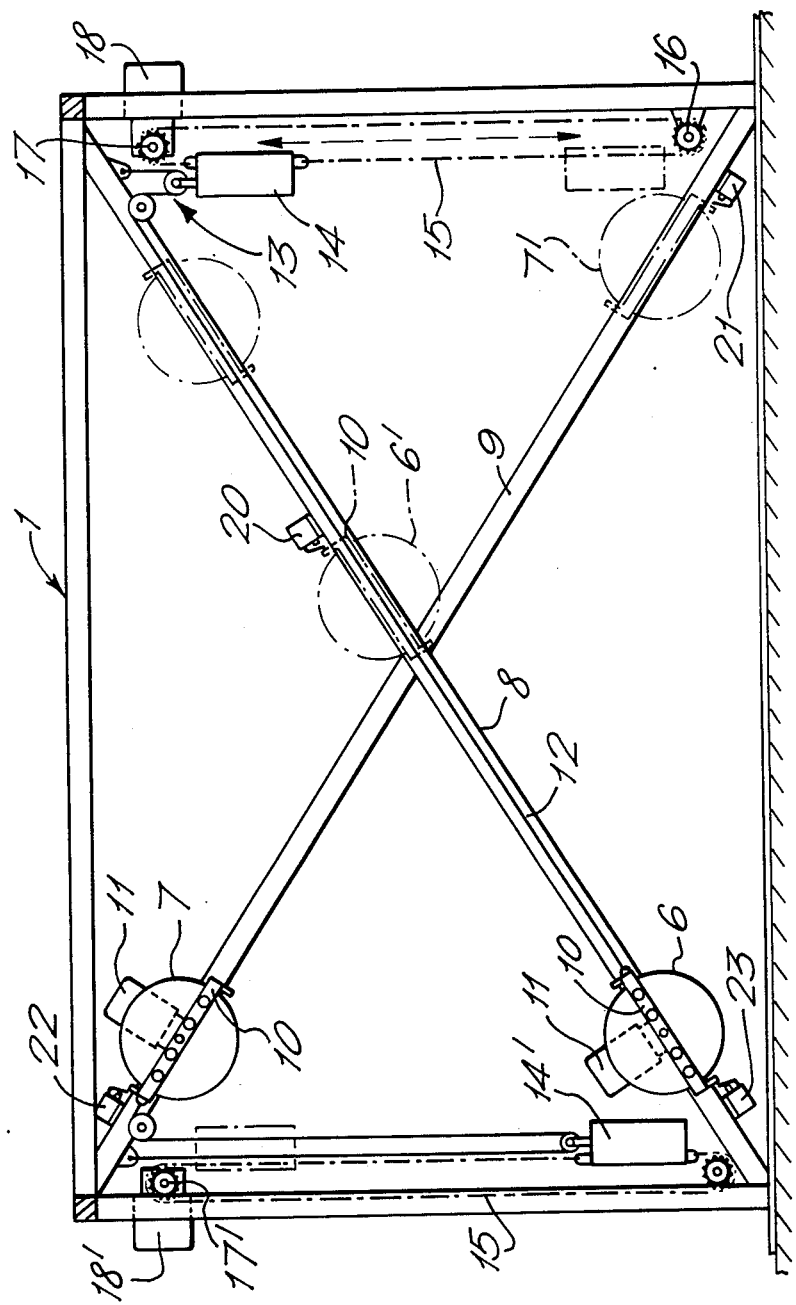
FIG. 2 is a side elevation of the apparatus as shown in FIG. 1 illustrating schematically the brush drive means.

Turning now to FIG. 2 the drive mechanisms for the horizontal brushes 6, 7 are illustrated schematically. The trolley 10 of the first roller 6 is connected by means of a steel cord or the like 12 via an arrangement of pulleys 13 to a counterbalancing weight 14. The weight 14 is suspended by an endless cord or chain 15 coupled to and extending round sprockets 16, 17. The lower sprocket 16 is a free-wheeling sprocket, while the upper sprocket 17 is a one-way sprocket which is coupled to a first brush return drive motor 18 so as to be freely rotatable relative thereto only in the anti-clockwise direction as illustrated. As such, the first brush is freely movable rightwardly and upwardly as illustrated during which the counterweight 14 moves downwardly, but is prevented from returning to its initial position until the motor 18 is actuated so as to rotate the sprocket 17 in a clockwise direction.

A similar arrangement of pulleys and counterweight is provided for the second brush 7, although in this case the upper sprocket 17' coupled to the counterweight 14' is not completely free-wheeling in the anti-clockwise direction but rather is powered in that direction by the drive motor 18' through a suitable gearing arrangement or frictional drive such that upon actuation of the motor 18' in the anti-clockwise direction the brush 7 is urged downwardly along the track 9 into engagement in use with the roof or rear part of a vehicle.

As illustrated schematically in FIG. 2, suitable control switches 20, 21, 22, 23 are mounted to the tracks 8, 9, the switches being engageable by the respective trolleys 10 and being connected to the respective motors 18, 18' by suitable circuitry 24 to control the washing cycle as will be described in more detail below.

Figure 3A:
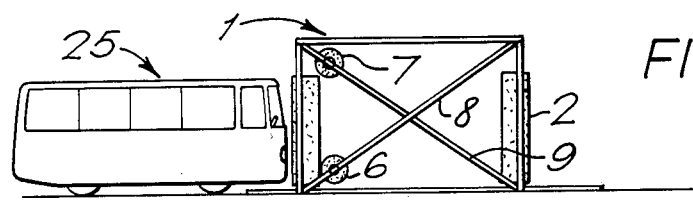
FIGS. 3a to 3g are schematic side elevational views on a smaller scale illustrating the apparatus in use.
Figure 3B:
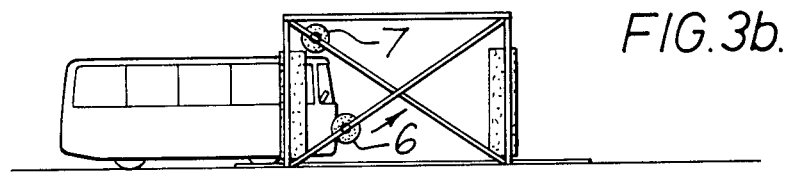

Referring additionally now to FIGS. 3a to 3g the operation of the illustrated vehicle washing apparatus will be described. As shown in FIG. 3a a vehicle 25 is approaching the apparatus with the brushes 6, 7 in their initial positions wherein the first brush 6 is located close to ground level and the second brush 7 is upwardly spaced from the roof of the vehicle. As the vehicle approaches, a start switch is actuated either by the driver, an attendant or automatically, whereupon the vertical brushes 2 at the vehicle entrance side of the apparatus together with the first horizontal brush 6 are actuated and start to rotate. In addition, in response to the start switch being actuated water and detergent are sprayed within the apparatus through a suitable arrangement of nozzles. In this condition, the traffic lights 5 at the entrance change to red, and the driver begins to move his vehicle through the apparatus at a suitable speed, for example between 5 and 15 mph. As shown in FIG. 3b the front of the vehicle engages the first brush 6 and begins to move the brush along the upwardly inclined tracks 8, such movement causing the counterweight 14 to move downwardly as shown in FIG. 2, this being permitted by virtue of anti-clockwise rotation of the one-way sprocket 17. It will be appreciated that since the brush 6 is moved upwardly by virtue of the engagement thereof with the front end of the vehicle 25, the brush effectively follows the contours of the vehicle and thorough cleaning is achieved.

Figure 3C:
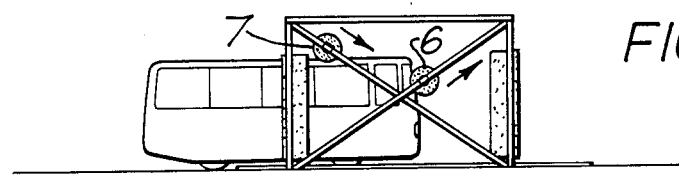

Once the vehicle has driven sufficiently far into the apparatus for the first brush to have passed the crossover point of the tracks 8, 9, as shown in dotted lines 6' in FIG. 2, the trolley 10 engages and actuates the first control switch 20. Actuation of the switch 20 causes the second brush 7 to start rotating and also causes the return motor 18' thereof to rotate the counterweight sprocket 17' in an anti-clockwise direction. This causes the trolley 10 to move downwardly along the track 8 such that the second brush 7 engages the roof of the vehicle as shown in FIG. 3c. Since the sprocket 17' is driven in the anti-clockwise direction by the motor 18' via a suitable frictional drive means, the brush 7 is continually urged downwardly along the track 9 and this ensures continuous engagement with and adequate cleaning of the roof and rear part of the vehicle by the brush 7.

Figure 3D:
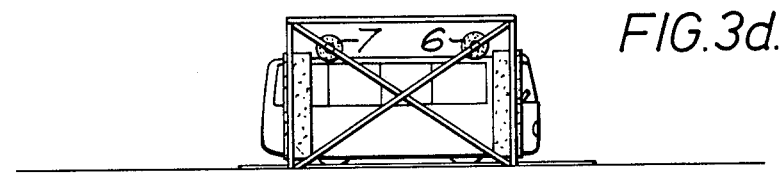
Figure 3E:
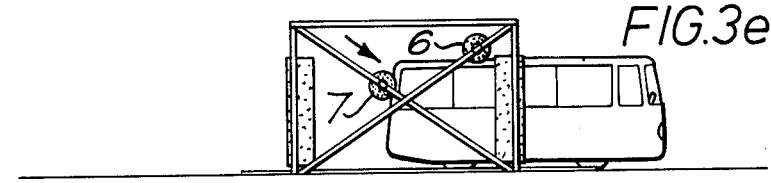

Control switch 20 is also effective to initiate rotation of the vertical brushes 2 at the exit side of the apparatus, such that as shown in FIGS. 3d and 3e the sides of the vehicle are again washed as the vehicle leaves the apparatus. As also shown in FIG. 3e, as the vehicle emerges, the second roller 7 follows the contours of the rear portion thereof.

Figure 3F:
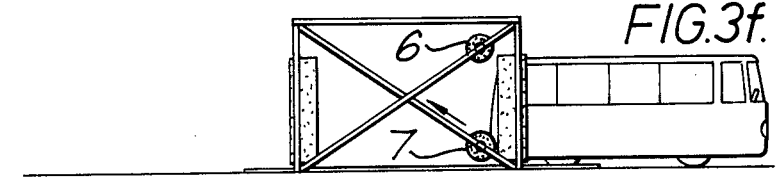
Figure 3G:
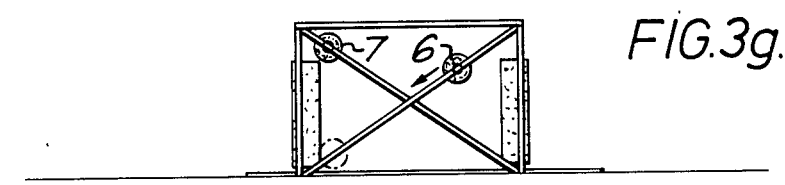

As shown in FIG. 3f, once the vehicle has passed through the apparatus, the first brush 6 is retained in its uppermost position, which corresponds to the highest part of the vehicle roof, by virtue of the one-way sprocket 17. When the second brush 7 reaches its lowest position (as shown in broken lines 7' in FIG. 2) a mounting trolley 10 thereof engages and actuates the second control switch 21. This switch causes all the rollers to stop rotating, and in addition operates the return motor 18' of the second roller to rotate the sprocket 17' in a clockwise direction. In this way, the second brush 7 is returned to its initial, uppermost position, whereupon the trolley 10 engages the third control switch 22 which in turn operates the return motor 18 of the first brush 6. The motor 18 rotates the sprocket 17 in a clockwise direction thus causing the first brush to move downwardly as shown in FIG. 3g. Once the first brush 6 has returned to its initial position, the fourth control switch 23 is actuated whereupon the apparatus is reset and ready for use, the traffic light 5 being changed to green.

I claim:

1. A vehicle washing apparatus having a framework defining a tunnel having an entrance and an exit through which a vehicle to be cleaned may pass, comprising:
   (a) a first pair of laterally spaced tracks inclined upwardly with respect to a generally horizontal direction from the entrance to the exit;
   (b) a second pair of laterally spaced tracks inclined downwardly with respect to a generally horizontal direction from the entrance to the exit such that the first and second pair of tracks cross at their approximate mid-points;
   (c) a first rotatable brush supported generally horizontally on the first pair of tracks so as to traverse along the length of the first pair of tracks from an initial position adjacent the entrance to a second position adjacent the exit as the vehicle passes through the apparatus so as to wash at least a front portion of the vehicle; and
   (d) a second rotatable brush supported generally horizontally on the second pair of tracks so as to traverse along the length of the second pair of tracks from an initial position adjacent the entrance above the first rotatable brush to a second position adjacent the exit as the vehicle passes through the apparatus so as to wash at least a rear portion of the vehicle.

2. Apparatus as claimed in claim 1 wherein the first and second pairs of tracks are respectively upwardly and downwardly inclined at angles of between 15° and 50° to the horizontal.

3. Apparatus as claimed in claim 1 further comprising actuating means for the second brush in initiate movement thereof along the second pair of tracks only after the first brush has passed the cross-over point of the first and second pair of tracks.

4. Apparatus as claimed in claim 3 wherein the actuating means for the second brush comprises switch means mounted adjacent one track of the first pair of tracks above the cross-over point, which, upon the first brush passing thereby, initiates movement of the second brush along the second pair of tracks.

5. Apparatus as claimed in claim 1 further comprising means for returning the brushes to their initial positions once cleaning of a vehicle is complete.

6. Apparatus as claimed in claim 5 further comprising means for holding the first brush in its second, uppermost position adjacent the exit until after the second brush has returned to its initial position.

7. Apparatus as claimed in claim 6 further comprising first and second switch means provided adjacent the upper and lowermost ends, respectively, of one of the second pair of tracks, the second, lower switch means operable upon the second brush reaching its second, lowermost position adjacent the exit to initiate the returning of that brush to its initial, uppermost position, the first, upper switch means operated when the second brush returns to its initial, uppermost position to cause the first brush to be returned in turn to its initial, lowermost position.

8. Apparatus as claimed in claim 1 wherein the first and second brushes are carried by trolley assemblies which are moveable along the respective tracks, and further comprising a system of weights and pulleys coupled to the trolley assemblies to provide a counter balancing arrangement for the first and second brushes.

9. Apparatus as claimed in claim 8 further comprising a one-way sprocket associated with the system of weights and pulleys for the first brush whereby the first brush is retained in its second, uppermost position until reverse operation of the sprocket is enabled consequent upon the second brush returning to its initial position after the washing cycle is complete.

* * * * *